11,112,386
Patented Nov. 26, 1963

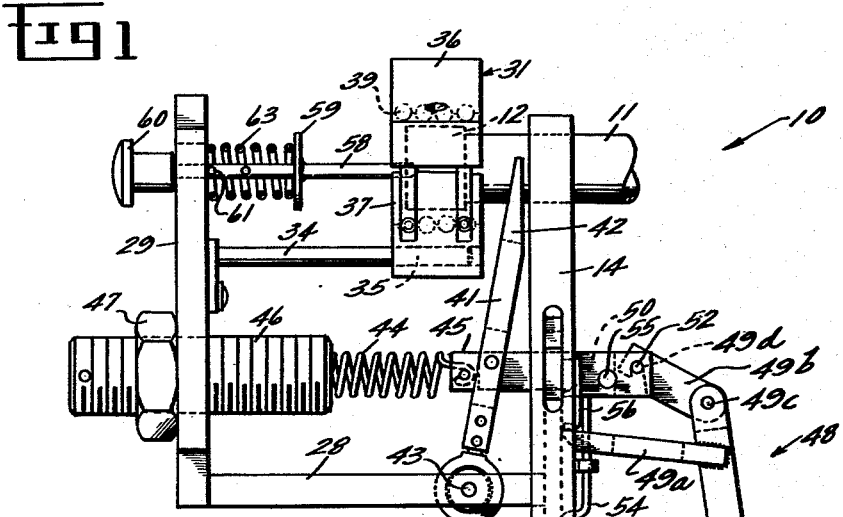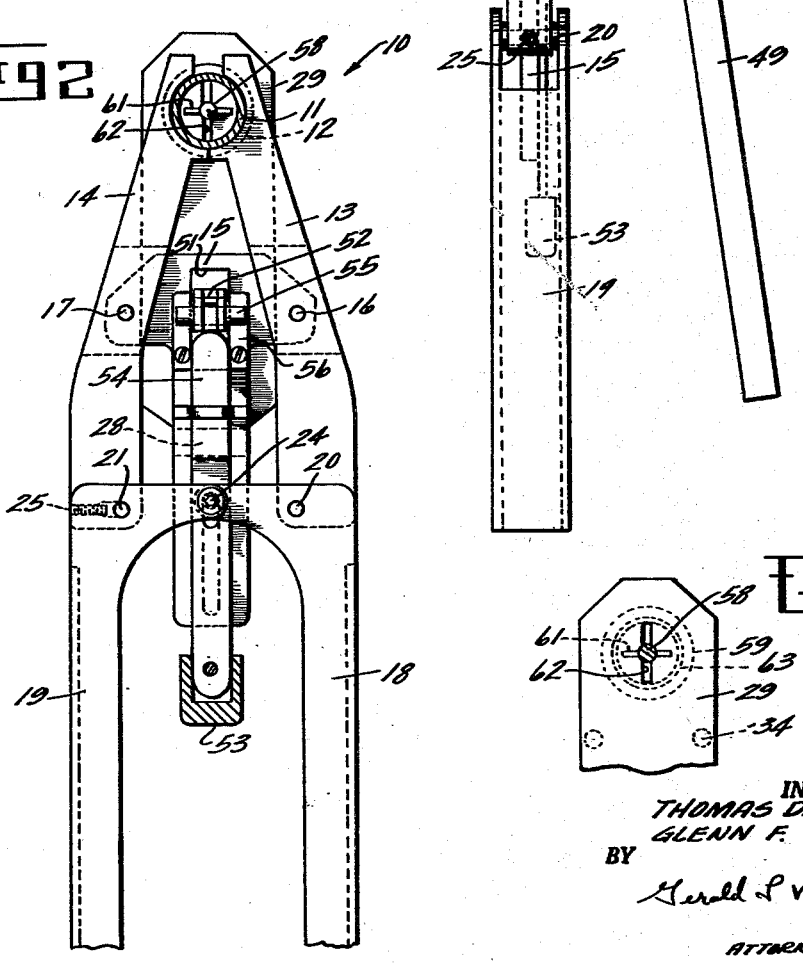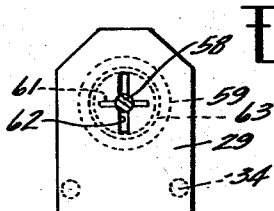

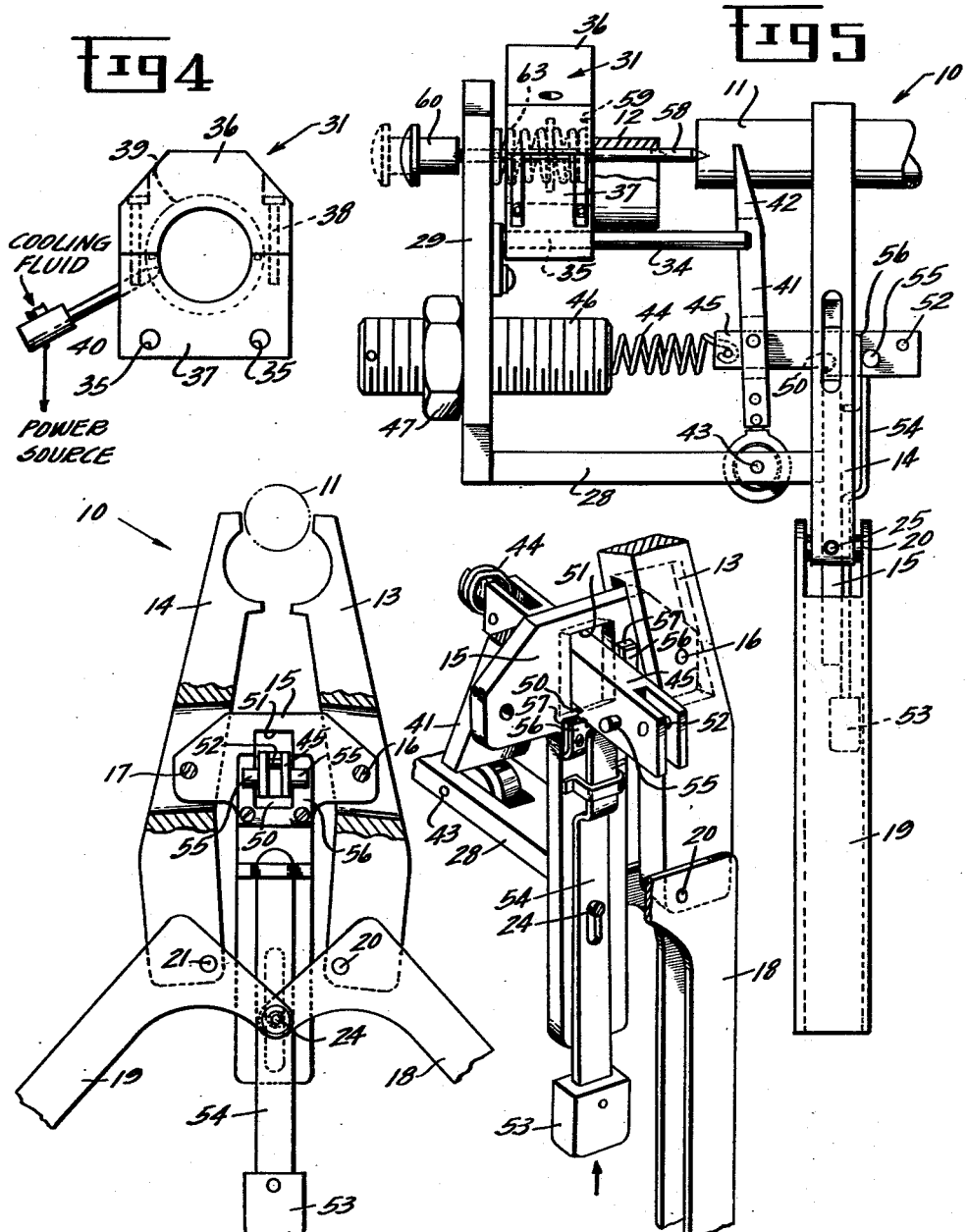

3,112,386
COUPLING REMOVING TOOL
Thomas D. Oatman, Cincinnati, and Glenn F. Dixon, Middletown, Ohio, assignors to General Electric Company, a corporation of New York
Filed Dec. 29, 1961, Ser. No. 163,973
4 Claims. (Cl. 219—7.5)

This invention relates to a coupling removing tool and more particularly to a tool incorporating means for attachment to a pipe, means for heating a coupling on the pipe and thereafter means for exerting a force on said coupling to remove the coupling from the pipe.

In numerous applications it is necessary to repair hydraulic lines, etc. which have brazed joints while the lines are still located on the apparatus on which they are used. For instance, in aircraft engines utilizing brazed hydraulic lines it is often necessary to remove certain sections of the tubing for repair operations. In doing so, the usual practice is to cut the coupling which attaches the tubing to other lines on the engine or otherwise loosen the fixtures at all points of attachment to allow such removal. Where couplings must be cut, this leaves the cut coupling on the tubing attached to the engine which must subsequently be heated and removed. However, difficulties arise in both applying heat to this coupling without overheating and possibly damaging other adjacent assemblies on the engine and in addition, after causing the brazing alloy to flow by heating, it is thereafter necessary to exert a force on the coupling to separate the coupling from the tubing. However, such a force may not be applied so as to loosen the tubing at the end fastened to the engine or in a manner to bend or damage the tubing. To further complicate matters, generally the working space is extremely limited.

It is therefore one object of this invention to provide a unique coupling removing tool having means for attachment to the tube, simultaneously heating the coupling and tube to cause the brazing alloy to flow and thereafter means for exerting an axial force on the coupling to separate it from the tubing.

In accordance with one embodiment of the invention, there is provided a combination tool having a clamping head with handles attached for actuation to allow placement on a tube, with a heating means, preferably an induction heating coil, incorporated on the tool for placement around the coupling and tube to heat these parts and cause the brazing alloy to be heated to fluid temperature and with a striker means incorporated to thereafter strike or exert an axial force on the coupling to force it off the end of the tube. Means may also be provided for catching the coupling once it is removed.

Other objects and many of the attendant advantages of this invention will be readily appreciated as the same becomes better understood by reference to the following detailed description when considered in connection with the accompanying drawings wherein:

FIG. 1 is a side view of the tool clamped on a section of tubing with the cocking means attached, FIG. 2 is a front view of the tool, FIG. 3 is a partial front view of the tool showing the clamping head actuation, FIG. 4 is a front view of the induction heating coil assembly, FIG. 5 is a side plan view showing the heating coil moved out of heating position with the striking mechanism tripped, FIG. 6 is a perspective view showing the striker mechanism, and FIG. 7 shows the lock positioning means for the coupling retainer.

Referring now primarily to FIGS. 1, 2, and 3 therein is illustrated the tool 10 clamped on a tube or conduit section 11 with a coupling 12 attached which it is desired to remove. The tool includes a clamping portion of the double-toggle type including clamping jaws 13 and 14 pivotally connected to the support member 15 by pivot pins 16 and 17 and pivotally connected for actuation to handles 18 and 19 at pivot connections 20 and 21. Handles 18 and 19 are pivotally inter-connected by pivot pin 24 located in an elongated slot 25 in the support member 15.

It may be seen that by pulling the handles 18 and 19 apart, the pivot pin 24 is caused to move downward and pivots 20 and 21 are moved toward each other so as to rotate the clamping jaws 13 and 14 about the fixed pivots 16 and 17 and cause them to move apart. Naturally, the opposite movement of forcing the handles 18 and 19 together causes the clamping jaws to move together. The pivot pin 24 represents an overcenter arrangement wherein when the clamping jaws are caused to move together the pivot pin 24 being closer to the clamping jaws than a line joining pivots 20 and 21 thereby locks the clamping jaws in the clamping position by an overcenter action wherein any force on the jaws tending to cause the jaws to move apart merely attempts to force the pin 24 toward the jaws rather than away which is necessary for the opening movement of the handles. An adjusting screw 25 is provided bearing against the pivot pin 21 to adjust the clamping pressure on the clamping jaws 13 and 14 by varying the distance between the pivot pins 20 and 21.

Extending normal to the support member 15 is member 28 from which extends support member 29 normal to member 28 and parallel to the clamping jaws. Once the conduit 11 is supported in the clamping jaws with a coupling 12 attached which it is desired to remove, it is necessary first to heat the coupling and tube to cause the brazing alloy or the filler attaching the coupling to the tubing to reach melting or flowing temperature so that the coupling and tube may be separated. It should be pointed out at this point that while brazed couplings are specifically mentioned as the type connections which the tool may separate, other types of connections may also be handled where it is necessary to apply heat and thereafter separate the parts by a properly directed force, for instance such other means of attachment are couplings joined by plastic adhesives, soldering and such other means.

To accomplish the heating of the coupling and tube there is provided an induction coil heating assembly 31 as illustrated in the front view in FIG. 4. The heating assembly is supported from the heating assembly support member 34 extending from support member 29 which extends through openings 35 in the heating assembly to allow the assembly to be moved axially over and away from the coupling and tube assembly. The coil assembly itself comprises two half sections 36 and 37 held together by screw members 38 and includes a single conductor 39 through which high frequency current may be passed to heat the coupling and tube by an induction heating process in a manner well known to the art. The conductor 39 may be hollow to further allow for conductor cooling fluid to be passed therethrough during the heating operation. Electrical connections are made to the heating assembly through conductor 39 by suitable connectors 40 connected to a suitable power source and through which cooling fluid may also be introduced through these connectors. By assembling the heating assembly in the half sections 36 and 37 the heating assembly may be removed from a tool easily for replacement, repair, etc.

Once the coupling and tube have been heated sufficiently to facilitate melting the brazing material holding the two together and the heating coil has been moved out of position, it is then necessary to exert an axial force on the coupling while holding the tube stationary to separate the two members. Naturally this is difficult because the two members are at extremely high temperatures, the working space may be limited and it is further necessary that this force not be exerted in a manner to be transmitted through the tube 11 to other parts of the apparatus to which the tube is fastened. To facilitate this longitudinal force or what will be referred to as the separating force, a spring loaded striker 41 is provided consisting of a forked end 42 fitting partially around the tube 11. By pivoting the striker member 41 about the pivot support 43 attached to the support member 28, it may be seen that a longitudinal force is applied to the coupling by the forked end 42 hitting the coupling and since the clamping jaws hold the tube stationary a separating force is applied between the coupling and tube. To apply this separating force a spring member 44 biases a trigger member 45 which is pivotally attached to the striker member 41, the spring extends to the screw member 46 attached to and extending through the support member 29 with a nut 47 thereon. By adjusting the nut 47 the tension on the spring 44 may be adjusted. The trigger member 45 extends on through the opening 51 in support member 15 and as is better illustrated in FIG. 6, includes a shoulder 50 which extends over the edge of the opening 51 through which the striker member extends. When the trigger member 45 and the striker member 41 are actuated to the right (in the FIG. 1 illustration) against the action of the spring 44 and the shoulder 50 is hooked over the edge of the opening 51 the striker assembly may be locked in the cocked position. To simplify the cocking of the striker assembly an accessory tool 48 is provided consisting of a handle 49, a post assembly 49a and a pivoted connector 49b attached to the end of the handle by pin 49c. As illustrated in FIG. 1, a hooked end 49d is attached to a pin 52 in the end of the trigger member 45 and when the post 49a is positioned against the support member 15 and the handle 49 is pivoted in a direction toward the handles 18 and 19, the trigger member 45 and striker arm 41 are moved to the right thereby extending the tension spring 44 and by further moving the handle 49 in the same direction, a slight downward force is applied to the trigger member 45 by reason of the offset of the pin 53 with respect to the pivot 52 and the trigger member 45. This causes the member 45 to move down across the edge of the opening 51 to thereafter hold the trigger member 45 in the locked position. Thereafter the accessory tool may be removed from the tool 10 for the coupling removing operation. The removal of this accessory tool decreases the size of the coupling removing tool to allow for the use of the tool in smaller working areas.

After the striker assembly has been cocked, it may be released by pushing up on the small handle 53 which moves the lever 54 longitudinally to actuate the trigger member 45 to cause the shoulder 50 to clear the edge of the opening 51 allowing the striker assembly to move to the left. The striker forked end 42 thereafter strikes the coupling and exerts a separating force between the coupling and the tubing 11. The movement of the trigger is subsequently stopped by pin 55 striking the striker plate 56 with a resilient pad 57 located between the plate 56 and the support member 15 absorbing the shock.

While the operation of the apparatus has been described at various places heretofore, to summarize, the tubing is clamped within the clamping jaws 13 and 14 with the coupling 12 attached and extending between the jaws and the support member 29 as illustrated. The striker mechanism should be cocked prior to this positioning of the tool and the induction heating assembly 31 is moved to heating position over the coupling 12 and the connectors 40 attached for excitation of the heating assembly. Thereafter when the coupling and tubing reach the proper temperature, the heating assembly is moved to the left along the heating assembly support 34 and along a coupling support member 58 provided for the purpose of catching the coupling once it is removed from the tube 11. Thereafter the handle is actuated in the direction of the arrow as illustrated in FIG. 6 to cause the shoulder 50 to disengage with the edge of the opening 51 and the striker assembly is allowed to pivot to the left under the action of spring 44. The forked end 42 catches the coupling and exerts a separating force against the coupling and away from the clamping jaws 13 and 14 holding the tubing 11 stationary and the two are thus separated. The coupling thereafter is supported by the coupling support 58 which prevents the hot coupling from flying unhindered, possibly causing an injury or fire. The flange 59 protects the heating assembly 39 from being hit by the flying coupling. Thereafter if it is desired to remove the coupling 12 from the tool 10, the handle 60 may be pulled out as illustrated in FIG. 5 with a twisting motion to align the pin 61 with the slot 62 and may thereafter be again twisted to hold the handle and the coupling support member 58 in this retracted position while the coupling is being removed from the tool. A compression spring 63 extending between the support member 29 and the flange 59 holds the support member tight in either position.

It may be seen that in this manner there is provided a compact and easily portable coupling removing tool which uniquely combines the operaitons necessary for an efficient and quick coupling removal by providing for clamping the tubing to position the tool, for heating the tube and coupling and finally for exerting a separating force between the coupling and tubing to separate the two after they have been heated to sufficiently high temperature.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. A tool for removing a brazed coupling from a pipe comprising,
    a clamping head for attaching the tool to said pipe,
    means for heating said pipe and coupling to cause the brazing alloy between the pipe and coupling to become fluid,
    and means adjacent said clamping head to exert a force on the coupling to cause said pipe and coupling to separate.

2. A tool for removing a brazed coupling from a pipe comprising,
    a clamping head for attaching the tool to said pipe,
    an induction heating coil supported adjacent said clamping head for heating said pipe and coupling,
    and lever means adjacent said clamping head positioned to exert a force on said coupling in a direction to cause said pipe and coupling to separate.

3. A tool for removing a brazed coupling from a pipe comprising,
    a clamping head for attaching the tool to said pipe,
    means for heating said pipe and coupling to cause the brazing alloy between the pipe and the coupling to become fluid,
    a spring loaded lever means positioned adjacent said clamping head to exert a force on said coupling in a direction to separate said pipe and coupling,
    and means to release said lever means to exert a spring force on said coupling after said heating means has heated said pipe and coupling to the desired temperature.

4. A tool for removing a brazed coupling from a pipe comprising, a clamping head for attaching the tool to said pipe,
an induction heating coil supported on said tool in a manner to allow said coil to be moved in position to heat said pipe and coupling and to be moved away from said pipe and coupling after said heating process is completed,
a spring loaded lever means positioned between said coupling and clamping head in a manner to allow said lever to exert a force on said coupling in a direction away from said clamping head,
trigger means to hold said lever away from said coupling while said coupling and pipe are being heated,
and means to release said trigger means atfer said heating process is completed to allow said lever means to exert said force on said coupling to separate said coupling and pipe.

References Cited in the file of this patent

UNITED STATES PATENTS

| | | |
|---|---|---|
| 1,385,079 | Jones | July 19, 1921 |
| 1,569,397 | Robertson | Jan. 12, 1926 |
| 2,291,862 | Bailey | Aug. 4, 1942 |

FOREIGN PATENTS

| | | |
|---|---|---|
| 577,830 | Great Britain | June 3, 1946 |